(12) United States Patent
Azar et al.

(10) Patent No.: US 12,199,474 B2
(45) Date of Patent: Jan. 14, 2025

(54) ROTOR FOR AN ELECTRIC MACHINE

(71) Applicant: Siemens Gamesa Renewable Energy A/S, Brande (DK)

(72) Inventors: Ziad Azar, Sheffield (GB); Reza Nilifard, Odense C (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 255 days.

(21) Appl. No.: 17/839,761

(22) Filed: Jun. 14, 2022

(65) Prior Publication Data

US 2022/0416602 A1 Dec. 29, 2022

(30) Foreign Application Priority Data

Jun. 23, 2021 (EP) .................................. 21181257

(51) Int. Cl.
*H02K 1/2791* (2022.01)
*F03D 9/25* (2016.01)
*H02K 21/22* (2006.01)

(52) U.S. Cl.
CPC .............. *H02K 1/2791* (2022.01); *F03D 9/25* (2016.05); *H02K 21/22* (2013.01); *F05B 2220/706* (2013.01)

(58) Field of Classification Search
CPC ........ H02K 1/2791; H02K 21/22; H02K 1/32; H02K 7/1838; H02K 9/08; H02K 9/04; H02K 1/27915; H02K 2201/03; H02K 2213/03; F03D 9/25; F03D 15/20; F03D 80/60; F05B 2220/706; Y02E 10/72
USPC ...................................................... 310/216.01
See application file for complete search history.

(56) References Cited

U.S. PATENT DOCUMENTS

| 2011/0175364 A1* | 7/2011 | Booth ................. | H02K 1/2791 |
| | | | 290/55 |
| 2012/0286520 A1 | 11/2012 | Booth | |
| 2013/0270954 A1 | 10/2013 | Erd et al. | |
| 2021/0028674 A1* | 1/2021 | Urresty ................. | H02K 21/14 |

FOREIGN PATENT DOCUMENTS

| CN | 102714450 B | | 7/2015 | |
| CN | 115428303 | * | 12/2022 | |
| DE | 102004031329 A1 | * | 1/2006 | ............. F03D 9/002 |

(Continued)

OTHER PUBLICATIONS

European Search Report issued on Dec. 8, 2021 for application No. 21181257.3.

*Primary Examiner* — Ahmed Elnakib
(74) *Attorney, Agent, or Firm* — Schmeiser, Olsen & Watts LLP

(57) ABSTRACT

A rotor for an electric machine, especially a generator of a direct drive wind turbine, includes a cylindrical rotor housing with several magnet means arranged at the inner housing surface, wherein each magnet means includes several magnet elements arranged in a row parallel to an axis of rotation, wherein the inner housing surface is provided with at least one groove-like recesses extending parallel to the axis of rotation, wherein each recess is covered by the magnet elements of a row, and wherein at least two magnet elements in at least some of the rows are arranged with at least one gap extending in the circumferential direction, which gap communicates with the respective recess.

15 Claims, 6 Drawing Sheets

(56) References Cited

FOREIGN PATENT DOCUMENTS

Figure 1:
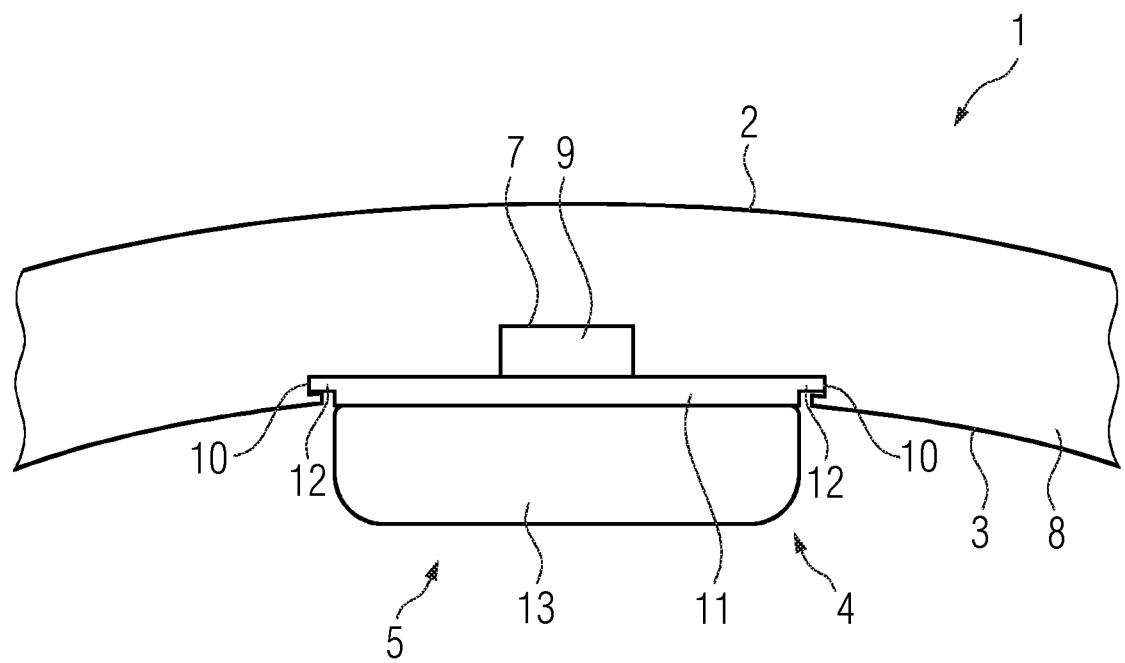

| EP | 2601728 | A1 | 8/2014 |
|----|---------|----|--------|
| EP | 3051668 | *  | 4/2017 |
| EP | 3402044 | *  | 11/2018 |

* cited by examiner

ROTOR FOR AN ELECTRIC MACHINE

CROSS-REFERENCE TO RELATED APPLICATIONS

This application claims priority to EP Application No. 21181257.3, having a filing date of Jun. 23, 2021, the entire contents of which are hereby incorporated by reference.

FIELD OF TECHNOLOGY

The following refers to a rotor for an electric machine, especially a generator of a direct drive wind turbine, comprising a cylindrical rotor housing with several magnet means arranged at the inner housing surface.

BACKGROUND

A wind turbine, as commonly known, comprises a tower with a nacelle arranged at its top. It further comprises several turbine blades attached to a hub of the nacelle. The blades interact with the wind making the hub rotate. To the hub a generator is coupled, which is driven by the rotating hub. The hub is coupled to a rotor of the generator, which rotates in a direct drive arrangement around a stator. The rotor comprises a cylindrical rotor housing. At the inner housing surface several magnet means are, evenly distributed, arranged in the circumferential direction, with the magnet means usually being arranged in separate lines extending parallel to an axis of rotation of the rotor. The magnet means of the rotor interact with respective stator windings, when the rotor rotates around the stator, thereby inducing an electric current in the stator windings, as commonly known.

On the other hand, eddy currents are induced in the magnet means respectively the rotor housing, which eddy currents cause a temperature rise of the magnet means, particularly in concentrated winding generators. The temperature rise may negatively influence the magnetic properties of the magnet means and by this the performance of the electric machine respectively the generator.

To counteract this unwanted temperature problem, electric machines respectively generators especially for direct drive turbines use a forced air-cooling system. An airflow passes through the air gap between the rotor and the stator, thereby flowing along the magnet elements. While a certain cooling is given at the axial ends of the rotor, from where the air flow enters the gap between the rotor and the stator, the cooling effect decreases towards the center region, as the temperature of the air rises while flowing towards the center region. Therefore this forced air-cooling system does not provide a sufficient cooling, as still the magnet means experience higher temperature in the middle or center region than at the axial sides. Each magnet means therefore shows a temperature gradient, no homogenous temperature distribution is given.

SUMMARY

Embodiments of the invention propose a rotor for an electric machine, especially a generator of a direct drive wind turbine, comprising a cylindrical rotor housing with several magnet means arranged at the inner housing surface, which is characterized in that each magnet means comprises several magnet elements arranged in a row parallel to an axis of rotation, wherein the inner housing surface is provided with at least one groove-like recess extending parallel to the axis of rotation, wherein each recess is covered by the magnet elements of a row, and wherein at least two magnet elements in at least some of the rows are arranged with at least one gap extending in the circumferential direction, which gap communicates with the respective recess.

The rotor housing is designed with a number of groove-like recesses, which extend in the longitudinal direction of the rotor housing respectively parallel to the axis of rotation. These groove-like recesses are evenly distributed around the inner circumference of the rotor housing. The separate magnet means, which also extend in the longitudinal housing direction respectively parallel to the axis of rotation, are each realized by a certain number of separate magnet elements, which are arranged in a line building the respective row. The magnet elements of each row are arranged such that they cover the groove-like recess, seen the radial direction, so that below each separate row a separate air chamber or channel, realized by the respective recess, is provided. Furthermore, at least two magnet elements within at least some of the rows are arranged with a small gap between them, while all other magnet elements of each row directly abut each other, so that the respective row is closed, except for the gap, which extends in the circumferential direction. This gap communicates with the recess below the row. As the gap is open towards the air gap between the rotor and the stator at the inner side and the recess at the outer side, an airflow from the air gap of the stator side through the slit into the recess or vice versa is possible. This airflow allows for a certain airflow or convection of the air in the recess, which may therefore undergo a constant change, so that a certain airflow may be realized through the recess, which is at least at one point open to the surrounding. So cooling air may either enter from the air gap between the rotor and the stator into the gap between the magnet elements and through this gap into the recess, flowing through the recess and exiting the recess at its opening to the surrounding. The airflow may certainly also be vice versa, with the cooling air entering first through the opening into the recess, flowing through the recess and exiting the recess through the gap between the magnet elements into the gap between the rotor and the stator.

The inventive arrangement therefore provides means for an active airflow cooling of the magnet elements at the bottom side of the magnet elements, i.e. the side with which the magnet elements are arranged at the rotor housing, where the eddy current is induced. Due to the constant airflow, an appropriate cooling is therefore not only given at the open sides of the magnet elements facing towards the stator, but also at the opposite side respectively the bottom side arranged at or facing towards the rotor housing. Further, as a certain airflow through the recess is realized, it is also possible to provide an active cooling also in areas, where with prior art arrangements no cooling was possible, especially in the middle or center region of the rotor. The forced convection through the recess therefore allows an increased heat transfer between the rotor housing respectively the magnet elements and the cooling air, resulting in the mitigation or the prevention of temperature hot spots respectively an uneven temperature distribution along each magnet element row.

As mentioned, each recess is open to the surrounding at at least one point, so that at least one opening of the recess opens to the surrounding. This opening may be a radial opening, so that the recess opens towards the stator. This may be realized by an appropriate arrangement of the magnet elements, which do not cover the complete recess, but leave a certain small opening or slit at at least one axial end of the recess. Certainly, two respective radial opening at both axial ends of the recess may be provided, so that cooling air may enter or exit the recess at both longitudinal ends. In a preferred embodiment, as an alternative to these openings, embodiments of the invention propose that each recess is open to the surrounding at one or both longitudinal ends. The groove-like recess therefore is provided with one or two axial openings, which are open at one or both opposite axial recess ends in the axial direction, so that air enters or exits the recess from the axial sides of the rotor housing respectively the arrangement of the magnet elements. This arrangement is advantageous, as the cooling air flows into the air gap between the rotor and the stator from both axial sides, so that a parallel air entrance into the respective recesses from both axial sides is easily possible. After passing through the recess, the air exits through the at least gap or slit between the at least pair of magnet elements of the respective rows and flows to the stator respectively through the stator. A circulating airflow is therefore realized, with a synchronous cooling air entrance into the gap between the rotor and the stator and all recesses from the same sides.

This forced convection or airflow is possible, as the at least one gap or slit within the arrangement of the magnet elements realizes a flow passage between the recess and the gap between the rotor and the stator, therefore allowing a circulating air flow from a distanced opening of the recess to the gap or slit in the magnet element row. As the temperature hot spots in known arrangements were given in the center region of the rotor housing respectively each longitudinal magnet means, embodiments of the invention further proposes that the at least one gap is arranged in the center region of the row, seen in the longitudinal direction. This ascertains that the cooling air, which enters from both ends into the recess, flows completely through the recess and exits in the center region gap or slit, thereby allowing also an appropriate cooling of the center region.

While a positive cooling effect is already recognized with only one gap or slit provided in the respective magnet element row, which requires that only one pair of neighbouring magnet elements is distanced for realizing the gap, it is certainly also possible to provide more than one gap in the respective row. According to this embodiment for example two or three gaps or slits are provided in the respective row at different longitudinal positions, so that the cooling air may exit the recess at different positions, allowing for a larger flow volume. Providing more gaps within the respective row necessitates to distance more neighbouring pairs of magnet elements for realizing the respective gap or slit. Finally it is certainly possible to provide such a gap or slit between each pair of magnet elements of the respective row.

According to a preferred embodiment of the invention, in each row at least one gap or slit is provided. While it is certainly possible to provide such a gap or slit for example only in each second row, which already has a positive effect on the overall cooling or tempering of the rotor, it is certainly advantageous to provide at least one gap or slit in each row, so that all magnet elements arranged at the rotor housing inner circumference may actively be cooled by a forced airflow circulating through the recesses. Certainly, also according to this embodiment each row may be provided with more than one gap or slit.

When all rows are provided with one or the same number of several gaps or slits, it is desirable that the slits of all rows are arranged at the same longitudinal position or positions seen in the longitudinal direction. According to this embodiment the arrangement of the magnet elements of all rows, seen in the circumferential direction, is identical, so that also the position of the for example single gap in the center region of each row is the same in each row. The single gap of all rows is therefore arranged in a common circumferential plane. Certainly, if in each row for example two or three gaps are provided, also these three gaps of all rows are arranged in two or three separate circumferential planes. This ascertains that the magnet element distribution within each row is identical, so that also the overall magnetic properties of the rotor are mostly homogeneous, seen in the circumferential and longitudinal direction.

The width of each gap, seen in the longitudinal direction of the respective row, is preferably between 0.5-10 mm, and most preferably between 1-6 mm. The gap or slit is very small, but sufficient wide to realize the forced convection or airflow. It also does not negatively influence the magnetic field created by the respective magnet means or magnet element row.

As mentioned, the magnet elements are arranged and fixated at the inner housing surface. To simplify this fixation, each magnet element comprises a base plate and a magnet arranged on the base plate, wherein the rotor housing is provided with grooves arranged on both longitudinal sides of each recess, into which grooves the base elements of each row engage. This tongue and groove connection allows for a simple arrangement of the magnet elements, as it is only necessary to insert the sides or edges of the opposite tongues of the base plate, i.e. its side edges, into the axially open and opposing grooves of the rotor housing and moving them into the requested longitudinal position. A simple form fit arrangement is realized, wherein the respective magnet elements are certainly fixated in their final longitudinal position, so that no movement is possible after their final fixation.

Each recess itself has a rectangular cross section, but may certainly also have a kind of convex cross section or the like.

In a first alternative, only one recess is provided per row and covered by the magnet elements of the row. According to a second alternative, two or more parallel groove-loke recesses are provided and covered by the magnet elements of a row.

Further the length of a gap between two neighbouring magnet elements may correspond to the circumferential width of the magnet element. In this case the neighbouring magnet elements respectively their base plates do not abut. In an alternative the length of a gap may be less than the circumferential width of the neighbouring magnet elements. Here the neighbouring magnet elements respectively their base plats abut only locally, but not along the whole length of their side surface, leaving the respective gap open.

In a further embodiment of the alternative width the smaller or shorter gap it is possible, that two or more gaps are provided between two neighbouring magnet elements. Here the two or more short gaps are provided in a circumferential row between the neighbouring magnet elements respectively base plates.

Embodiments of the invention further refer to an electric machine, comprising a rotor as depicted above, and a stator arranged within the rotor.

Finally, embodiments of the invention also refer to a wind turbine, comprising an electric machine as mentioned above, acting as a generator.

BRIEF DESCRIPTION

Figure 2:
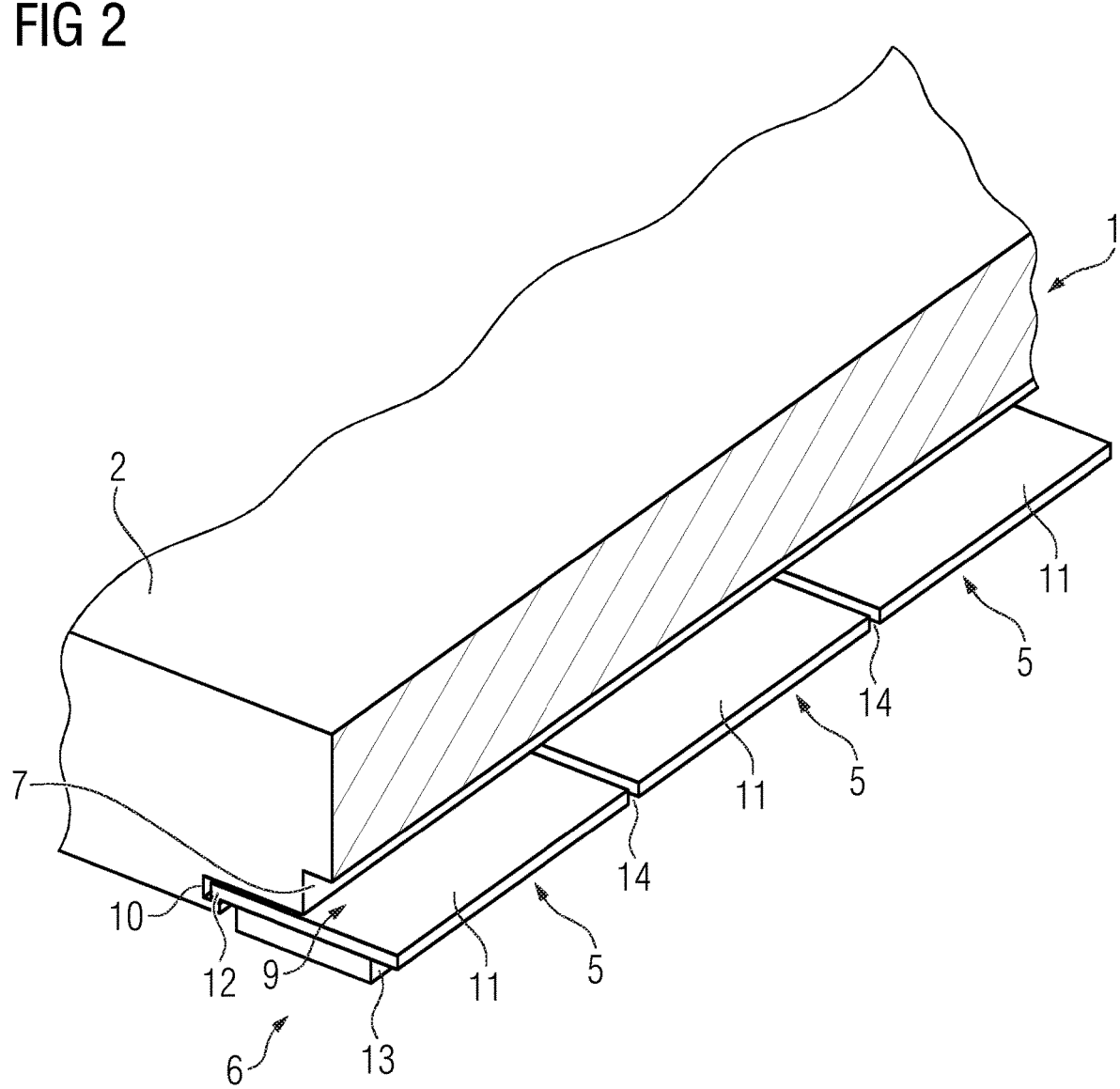
Figure 3:
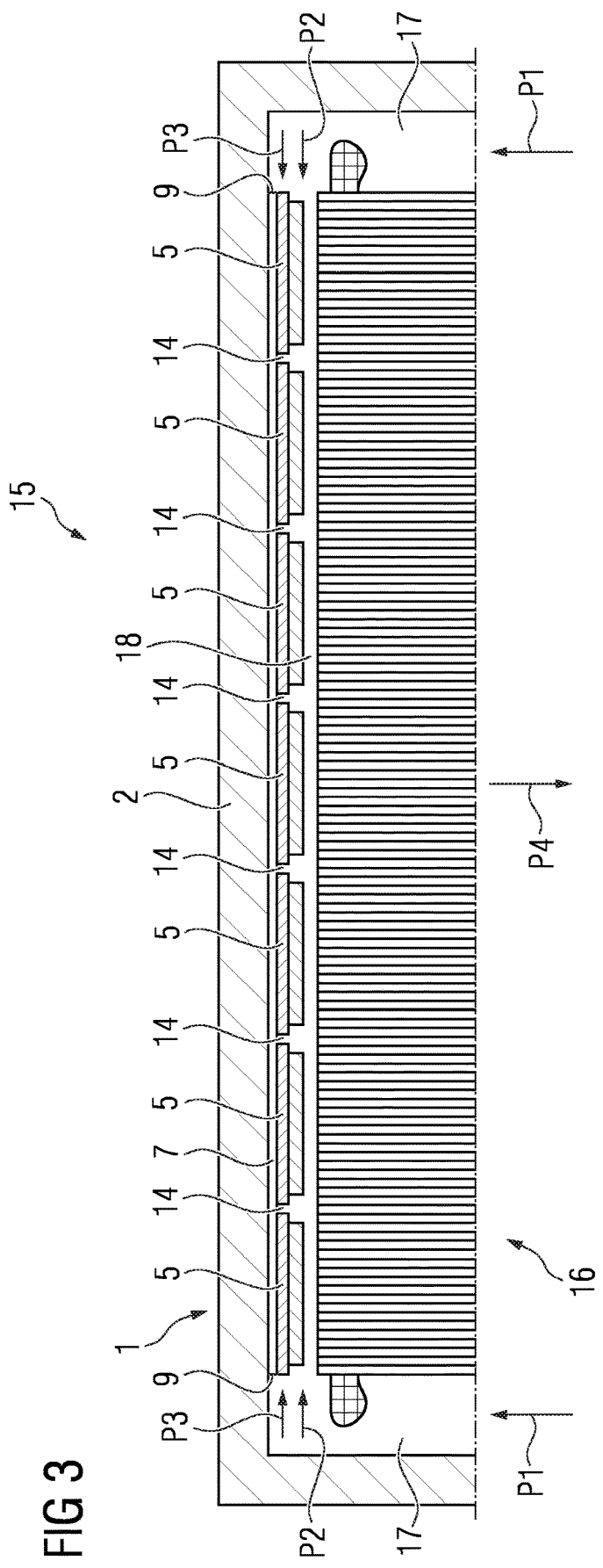
Figure 4:
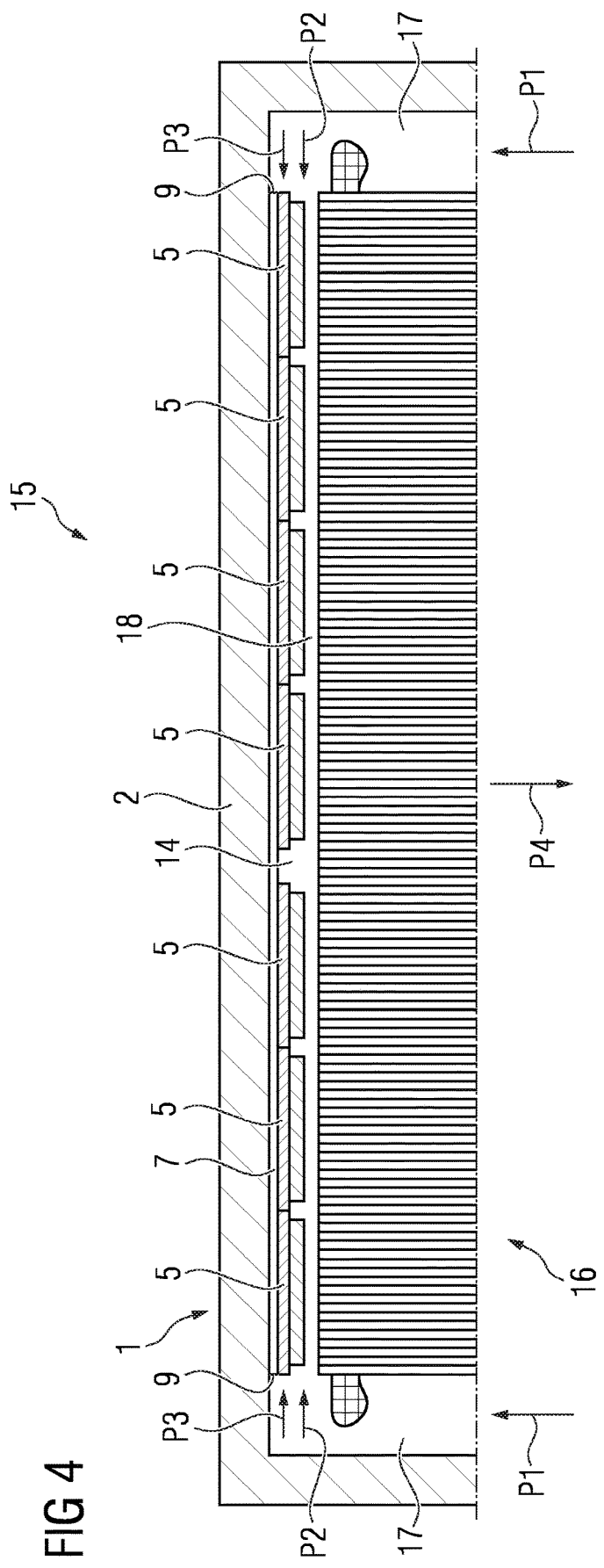
Figure 5:
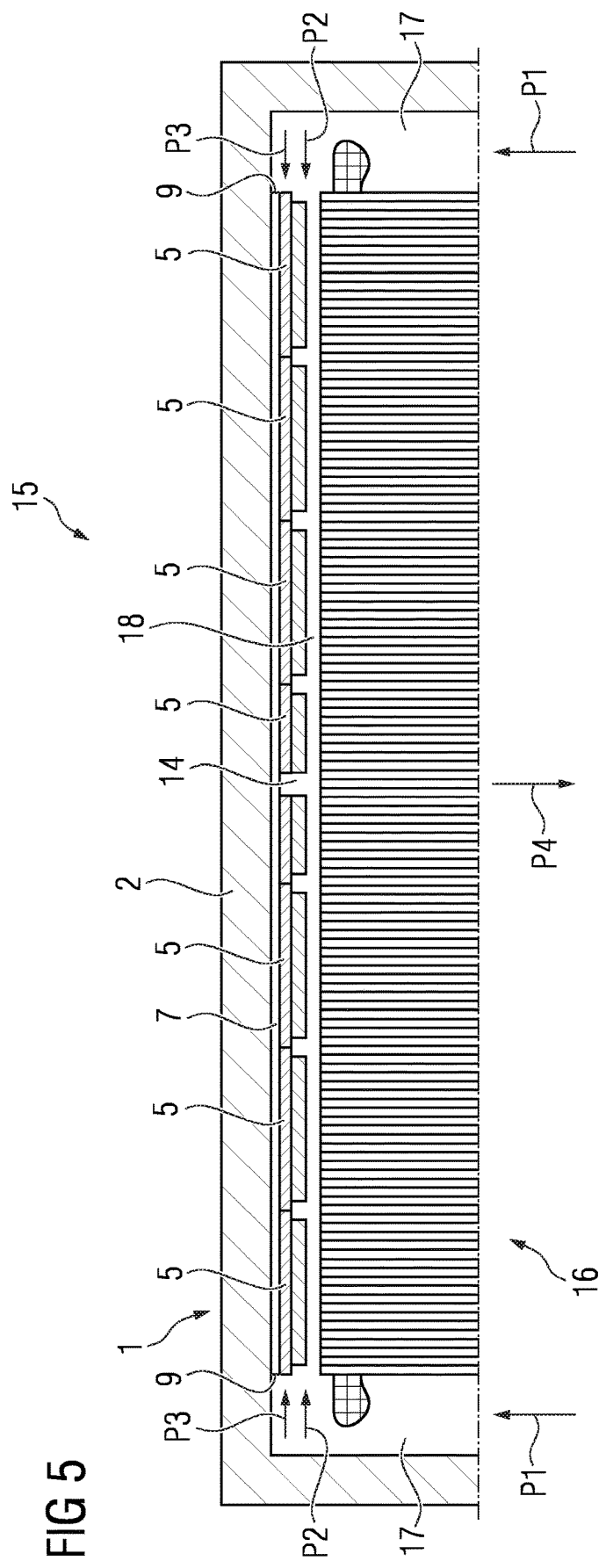
Figure 6:
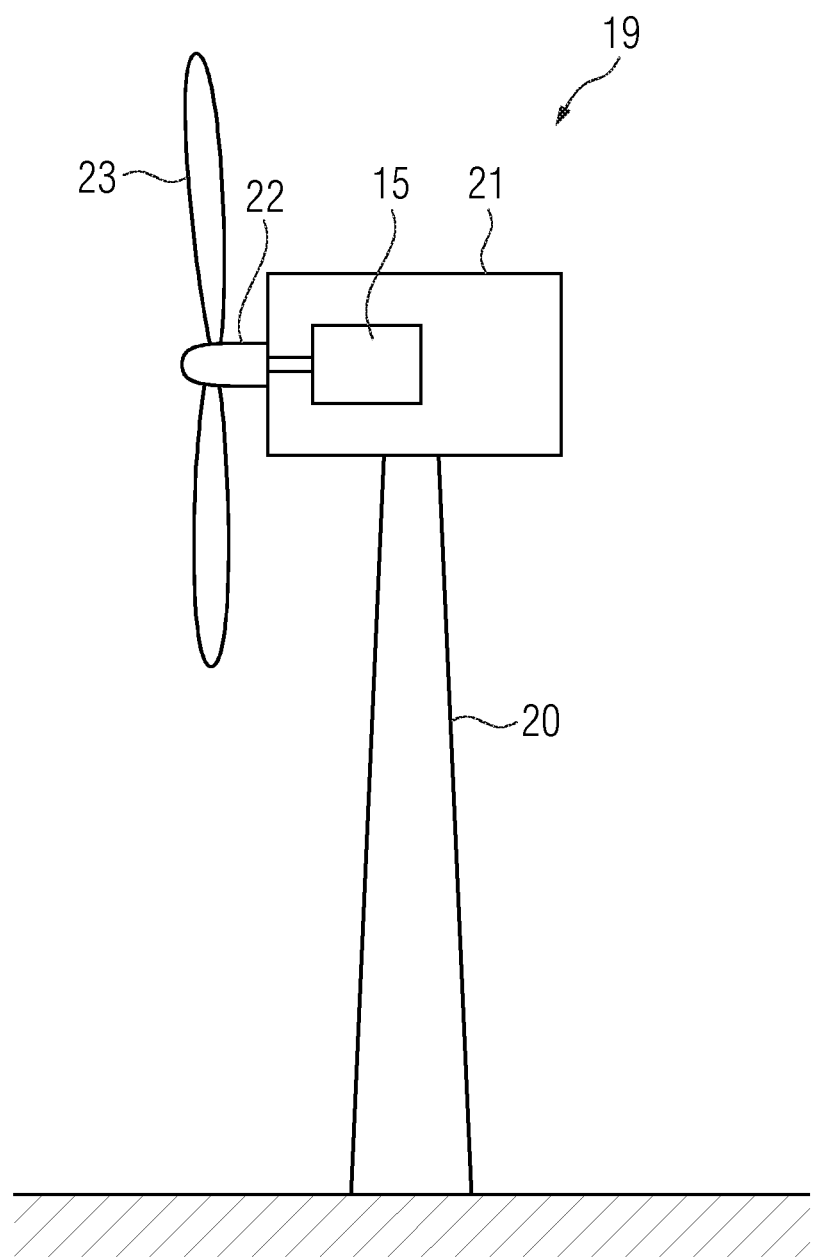

Some of the embodiments will be described in detail, with reference to the following figures, wherein like designations denote like members, wherein:

FIG. 1 a partial view of an inventive rotor seen in the longitudinal direction along the axis of rotation;

FIG. 2 a principle perspective and cut view of the rotor of FIG. 1;

FIG. 3 a principle illustration of an inventive electric machine comprising an inventive rotor of a first embodiment;

FIG. 4 a principle illustration of an inventive electric machine comprising an inventive rotor of a second embodiment;

FIG. 5 a principle illustration of an inventive electric machine comprising an inventive rotor of a third embodiment; and FIG. 6 a principle illustration of an inventive wind turbine.

DETAILED DESCRIPTION

FIG. 1 shows a partial view of a rotor 1 according to embodiments of the invention. The rotor 1 comprises a cylindrical rotor housing 2 with an inner housing surface 3, at which several magnet means 4 comprising a certain number of magnet elements 5, which are arranged in a row as shown in FIG. 2, are arranged. The respective rows 6 extend in the longitudinal direction of the rotor housing 2 respectively parallel to an axis of rotation of the rotor 1.

The respective rows 6 are evenly distributed around the circumference of the inner housing surface 3, so that a certain number of magnet element rows 6 distanced by the same circumferential angle is provided, wherein the magnet means 4 interact with a not shown stator respectively the stator windings inducing an electric current, when the rotor 1 rotates relative to the stator.

The rotor 1 respectively the inner housing surface 2 is provided with a number of groove-like recesses 7, which extend from one front surface 8 to the opposite front surface 8. The recesses 7, which in this example have a rectangular cross section, are all parallel to each other and parallel to the axis of rotation. They have axial openings 9 at both ends, so that cooling air can enter or exit each recess from the front surfaces.

As FIG. 1 and FIG. 2 show, the magnet means 4 respectively the magnet elements 5 are arranged at the inner housing surface 3 covering the groove-like recesses 7, so that each recess 7 is a longitudinal airflow channel open at both axial ends. For fixating each magnet element 5, the rotor housing 2 is, at its inner housing surface 3, provided with respective grooves 10, wherein two grooves are opposite to each other and axially open. For fixating the magnet elements 5, a tongue-and-groove-connection is realized. Each magnet element 5 comprises a base plate 11 having two longitudinal extending tongues 12. To the base plate 11 a magnet 13 is attached. For fixating the respective magnet element 5 at the rotor housing 2, the tongues 12 of the base plate 11 are axially inserted into the longitudinal extending grooves 10 as shown in FIGS. 1 and 2, so that a form fit is given. The magnet element 5 is pushed long the grooves 10 until it reaches its final longitudinal position, in which it is finally fixed. As each row 6 comprises a certain and same number of separate magnet elements, which are arranged in line, the recess 7 is therefore radially closed at its inner side, so that it in fact is an airflow channel, which is delimited by the rotor housing 2 and the base plate 11. Instead of one recess 7 per row 6 it is also possible to provide two or more parallel but smaller recesses 7 per row, which are covered by the base plates 11 of the magnet elements 5 of the respective row 6 forming several parallel but smaller channels.

FIG. 2 shows a perspective cut out view of the rotor 1, wherein the rotor housing 2 is cut in a plane extending radially through the rotor housing 2. It shows the groove-like recess 7 and the respective row 6 comprising several magnet elements 5 arranged by the tongue-and-groove-connection at the rotor housing 2 and covering the recess 7, which, as mentioned, has axial openings 9 at both ends.

As FIG. 2 shows, the magnet elements 5 are arranged in line, but they are arranged such that they do not abut each other with their base plates 11 and the magnets 13, but are distanced from each other, so that a respective gap 14 is realized between two neighbouring magnet elements 5, which gap 14, which may also be named as a slit, extends in the circumferential direction, and, as the magnet elements 5 cover the recess 7, also communicates with the recess 7. In the shown embodiment, between each pair of magnet elements 5 such a gap 14 is provided. It needs to be noted that this is optional, in fact at least one such gap 14 is to be realized according to embodiments of the invention.

The gap 14 is not only open to the recess 7, but also to the radial inner side towards the not shown stator, so that is communicates, seen radially to the outside, with the recess 7, and also, seen radially to the inside, with the gap between the rotor and the stator. As the recess 7 is provided with openings 9 at both axial ends, a forced airflow or air circulation is possible, as air may entrance the recess 7 from one or both openings 9, flow along the recess 7 respectively the channel a cooling of the magnet elements 5 from the base plate side is possible, while also the rotor housing 2 may be cooled. As the cooling air may flow through the whole recess 7 respectively, when it enters from both sides, may flow from both sides until the exit the recess at any of the gaps 14, a complete air cooling of all magnet elements 5, also of the magnet elements 5 provided in the center region seen along the axis of rotation, is possible.

The width of the respective gaps 14 is between 0.5-10 mm, desirably between 1-6 mm. If several of these gaps 14 are provided per row 6, the width of each gap 14 may be small, for example 1-2 mm, wherein, if for example only one gap 14 is provided, the width of the gap 14 may be larger, for example 4-6 mm. Seen in circumferential direction, the length of the gap in the shown embodiment corresponds to the width of the neighbouring base plates, but may also be smaller than the base plate width down to approx. 25% of the base plate width. When the gap length is smaller than the base plate width, the base plates abut only in part along their neighbouring side surfaces. Also multiple gaps may be provided between two neighbouring base plates, with each gap being certainly smaller than the base plate width.

Each row 6 is provided with one or more of these gaps 14. If for example only one gap per row is provided, each gap 14 is provided at the same longitudinal position, so that the airflow in each recess is the same regarding the exit or entrance through the respective gap 14. If several gaps 14 are provided per row 6, also the several gaps 14 of each row 6 are positioned at the same longitudinal positions.

FIG. 3 shows a principle illustration of an electric machine 15, wherein only a part of this machine 15 is shown. It comprises the inventive rotor 1, which embraces an inner stator 16, which is only shown in principle. As commonly known, the stator comprises a respective stator toothing and windings, concentrated windings arranged at the stator toothing.

The rotor housing 2 embraces the stator 16 also at the axial sides, as shown in FIG. 3, so that radial gaps 17 are realized, which merge with the circumferential gap 18 between the rotor 1 and the stator 16, as shown in FIG. 3.

In the embodiment shown in FIG. 3, the cutting plane runs through the respective recess 7, which recess 7 is shown in FIG. 3. It is, as described, covered by the respective magnet elements 5, wherein in this embodiment seven magnet elements 5 are arranged by the tongue-and-groove-connections. In this embodiment, between each neighbouring magnet element pair a respective gap 14 having a width of e.g. 1-2 mm is provided. As shown, these gaps 14 communicate with the recess 7 respectively the channel realized by this recess 7, and the gap 18 between the rotor 1 and the stator 16.

In operation, air is forced radially through the gaps 17, as shown by the arrows P1. A part of the air then enters the gap 18 between the rotor 1 and the stator 16, as shown by the arrows P2. A certain volume of this cooling air also enters the recess 7 respectively the channel from the respective openings 9, as shown by the arrows P3. This cooling air flows through the recess 7 and may exit the recess 7 through the respective gaps 14, so that the cooling air, which becomes heated while it flows through the recess 7, exits the recess 7 towards the stator 16 and circulates back, as shown by the arrow P4.

It is obvious that all magnet elements 5 of each row 6 may be cooled by the force air circulation through the recess 7. The cooling performance is enhanced, as also a cooling of the magnet elements arranged in the center region is possible, so that the temperature of all magnet elements 5 of a row 6 may be controlled and be held on a homogenous or almost homogeneous temperature level. Particularly the magnet temperature, particularly the maximum temperature, in concentrated winding generators may therefore be efficiently controlled, resulting in an increased efficiency and a better performance of the generator.

FIG. 4 shows a second embodiment of an inventive electric machine 15 again with the rotor 1 and the stator 16. Also here each row comprises a number of magnet elements 5, which cover the recess 7 realized in the rotor housing 2. Different to the first embodiment of FIG. 3, only one gap 14 is realized in the center region, in this embodiment between the third and the fourth magnet element 5, counted from the left. In this embodiment, the axial width of the gap 14 is larger than the width of the several gaps 14 of FIG. 3. The width of the gap 14 according to FIG. 4 measures for example 4-6 mm, while the width of the gaps of FIG. 3 measures to 1-2 mm. It is obvious that the three magnet elements, counted from the left, abut each other, then the gap 14 follows, and that the following four magnet elements again abut each other.

In this embodiment the air, as shown by the arrows P1, enters into the radial gaps 17 and then flows according to the arrows P2 through the gap 18 between the rotor 1 and the stator 16. A certain air volume also enters the recess 7 respectively the channel realized by the recess 7 and the base plates 11. As shown by the arrows P3, the cooling air enters from both sides into the recess 7. It flows along the recess 7 and may exit only at the single gap 14 which is provided in the center region. The exiting air then flows to the stator or through the stator 16, as shown by the arrow P4 and recirculates.

In the embodiment of FIG. 4, seven magnet elements 5 are provided, resulting in a position of the gap 14, which is not in the axial middle of the arrangement. FIG. 5 instead shows an inventive embodiment, where eight magnet elements 5 are provided, wherein again only one center gap 14 is realized between the fourth and the fifth magnet element 5, so that the gap 14 is right in the middle of the arrangement. The airflow again is as described previously. The air enters, see the arrows P1, into the radial gaps 17. A first air volume enters into the gap 18 between the rotor 1 and the stator 16, see the arrows P2. A second air volume, see the arrows P3, enters into the recess 7 and flows through the recess to the center gap 14, from where it exits towards the stator 16 and through the stator 16 as shown by the arrow P4.

FIG. 5 shows that the magnet elements have different axial lengths. While the first, the second, the third, the sixth, the seventh and the eighth magnet element 5 all have the same axial length, the fourth and the fifth magnet element 5 are a bit shorter in order to realize the respective center gap 14. It needs to be noted that certainly all magnet elements 5 may have the same axial length.

No matter which embodiment is realized, each embodiment allows for an improved temperature control, so that the magnet elements 5 of each row 6 have an almost uniform temperature respectively that a homogeneous temperature distribution is given along the row 6. This is advantageous in view of homogeneous magnetic properties of the magnet elements respectively the separate magnet means, which in turn is advantageous for the overall performance of the electric machine. Also the overall temperature may be reduced, compared to arrangements of the prior art.

Finally, FIG. 6 shows a wind turbine 19, comprising a tower 20 and a nacelle 21 arranged on top of the tower. In the nacelle an electric machine 15 according to embodiments of the invention, which act as a generator, is arranged. The rotor 1 of the electric machine 15 is coupled to a hub 22 carrying rotor blades 23, which interact with the wind and make the hub 22 rotate. Due to the rotational coupling, also the rotor 1 rotates, thereby inducing electric current in the stator windings, as commonly known.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A rotor for an electric machine, comprising:
    a cylindrical rotor housing with a plurality of magnet means arranged at the inner housing surface, wherein each magnet means comprises a plurality of magnet elements arranged in a row parallel to an axis of rotation, the inner housing surface provided with at least one recess extending parallel to the axis of rotation, and the at least one recess being covered by the plurality of magnet elements of a row;
    wherein at least two magnet elements in at least some of the rows are arranged with at least one gap between the at least two magnets, the at least one gap extending in a circumferential direction, the at least one gap communicating with the at least one recess;
    wherein a length of the at least one gap between two neighboring magnet elements corresponds to a circumferential width of the magnet element, or that the length of the at least one gap is less than a circumferential width of the neighboring magnet elements.

2. The rotor according to claim 1, wherein the at least one recess is open to a surrounding at one or both longitudinal ends.

3. The rotor according to claim 1, wherein the at least one gap is arranged in a center region of the row, seen in a longitudinal direction.

4. The rotor according to claim 1, wherein more than one gap is located in the respective rows.

5. The rotor according to claim 4, wherein between each pair of magnet elements of the respective row a gap is provided.

6. The rotor according to claim 1, wherein in each row at least one gap is provided.

7. The rotor according to claim 6, wherein gaps of all rows are arranged at a same longitudinal position seen in a longitudinal direction.

8. The rotor according to claim 1, wherein a width of each gap, seen in a longitudinal direction of the row, is between 0.5-10 mm.

9. The rotor according to claim 1, wherein each magnet element comprises a base plate and a magnet arranged on the base plate, further wherein the rotor housing is provided with grooves arranged in parallel to both longitudinal sides of each recess, into which grooves the base elements of each row engage.

10. The rotor according to claim 1, wherein the least one recess has a rectangular cross section.

11. The rotor according to claim 1, wherein two or more parallel recesses are provided and covered by the magnet elements of a row.

12. The rotor according to claim 1, wherein two or more gaps are provided between two neighboring magnet elements.

13. An electric machine, comprising the rotor according to claim 1 and a stator arranged within the rotor.

14. A wind turbine, comprising the electric machine according to claim 13 acting as a generator.

15. The rotor according to claim 1, wherein the at least one recess opens towards a stator.

\* \* \* \* \*